US012735300B2

(12) United States Patent
Butler-Miles et al.

(10) Patent No.: US 12,735,300 B2
(45) Date of Patent: Sep. 15, 2026

(54) AUTOMATIC CLOSING DOOR PROXIMITY DETECTOR

(71) Applicant: AIRDRI LIMITED, Eynsham (GB)

(72) Inventors: Malcolm John Butler-Miles, Eynsham (GB); Allan Robert Wiggins, Eynsham (GB)

(73) Assignee: AIRDRI LIMITED, Eynsham (GB)

( * ) Notice: Subject to any disclaimer, the term of this patent is extended or adjusted under 35 U.S.C. 154(b) by 266 days.

(21) Appl. No.: 18/524,112

(22) Filed: Nov. 30, 2023

(65) Prior Publication Data

US 2025/0171273 A1 May 29, 2025

(30) Foreign Application Priority Data

Nov. 23, 2023 (GB) ..................................... 2317953

(51) Int. Cl.
*B66B 13/26* (2006.01)
*G01S 17/04* (2020.01)

(52) U.S. Cl.
CPC .............. *B66B 13/26* (2013.01); *G01S 17/04* (2020.01)

(58) Field of Classification Search
CPC ................................ B66B 13/26; G01S 17/04
See application file for complete search history.

(56) References Cited

U.S. PATENT DOCUMENTS 4,794,248 A * 12/1988 Gray ....................... B66B 13/26 250/221
4,910,464 A * 3/1990 Trett ....................... G01S 17/04 340/552
2010/0319256 A1* 12/2010 Agam ..................... E05F 15/73 49/31
2014/0131557 A1* 5/2014 Collins ................... B66B 13/26 250/208.2
2017/0314314 A1* 11/2017 Collins ................... E05F 15/43

FOREIGN PATENT DOCUMENTS

| | | | |
|---|---|---|---|
| GB | 2414073 | A | 11/2005 |
| GB | 2453804 | A | 4/2009 |
| WO | 1987003100 | A1 | 5/1987 |

* cited by examiner

*Primary Examiner* — Nazra Nur Waheed
(74) *Attorney, Agent, or Firm* — Meunier Carlin & Curfman LLC

(57) ABSTRACT

The present invention provides a proximity detection system (10) for detecting an object (O) in a detection volume (V) comprising:

a first and a second boundary member (11,12), defining a plane (P);

The first boundary member (11) facing and movable relative to the second boundary member (12) and; the first boundary member (11) comprising a detector (20);

the detector (20) comprising one or more directional emitters (30) and one or more directional receivers (40);

wherein the one or more emitters (30) are positioned facing an acute angle α to the plane P, measured in the horizontal plane, to direct electromagnetic radiation at an angle α to the plane P and the one or more receivers (40) are positioned facing at an acute angle θ relative to the plane P.

22 Claims, 4 Drawing Sheets

AUTOMATIC CLOSING DOOR PROXIMITY DETECTOR

CROSS-REFERENCE TO RELATED APPLICATIONS

This application is a U.S. non-provisional application, which claims the benefit of priority to United Kingdom Patent Application No. 2317953.4, filed Nov. 23, 2023, the content of which is incorporated herein by reference in its entirety.

FIELD

The present invention relates to method and apparatus for sensing the presence of an obstacle in a detection zone. The sensing apparatus comprises boundary members which emit electromagnetic signals, and which have a variable location relative to the detection zone, such that their relative positions can be modified upon entry of an obstacle in the detection zone.

BACKGROUND

In the elevator industry, safety is a major concern which has required addressing over a long period of time. One particular area of concern is the possible entrapment of an item in the automated closing doors of an elevator which can result in damage to the elevator endangering those inside, or, if the item is part of a user then also injury of the user. This is a concern for a number of automated systems which are currently in use.

Photoelectric devices are extensively used in connection with elevator safety systems. How effectively a photoelectric device can be expected to perform in each working environment is measured in terms of excess-gain. Excess gain is conveniently defined as the ratio of the light signal available in each device location to the minimum light signal necessary to cause the device to function. The term 'photoelectric device' should be taken to include any device operable in response to electromagnetic radiation including, but is not limited to, infra-red radiation. Elevator doors are generally already provided with such an interruptible curtain of electromagnetic radiation like infrared radiation to ensure that there are no obstructions present in the doorway before the door closes. Such a curtain is generally provided by an array of transmitters of electromagnetic radiation, such as infrared LEDs, and an opposing array of receivers of electromagnetic radiation, such as infrared photodiodes, mounted on opposing sides of the elevator doorway, or both on the same side of the doorway with an opposing reflective strip. Such a curtain is only capable of providing a yes-or-no determination of whether an obstruction is present in the doorway.

This issue of entrapment has been addressed in for example GB Patent GB 2,414,073 (Airdri Limited) which describes a system for gap scanning in a door having a movable leading edge. The door opening between an open configuration wherein a first plurality of emitter units of beams of electromagnetic radiation located on one lateral boundary of a gap and a second plurality of receiver units for the beams is located on the other lateral boundary. A control means is provided for the emitter and receiver units to establish an array of beams across the gap in which a beam from one emitter in the first plurality can be received by a complementary receiver in the second plurality.

U.S. Pat. No. 4,910,464A (WO8703100A1), which incorporated herein by reference, also addresses the issue of entrapment of items in doorways by increasing the sensitivity and range of detection, and maintaining and often increasing the sensitivity when the sensor is very close to objects not to be detected, without false firing. This application describes a movable door in a proximity detection system for sensing obstructions in the path of a door, wherein the system comprises electromagnetic at least two transmitter/receiver pairs mounted on a leading edge or face of a door to transmit energy pulses in a direction which is not at right angles to the leading surface or edge of the door and facing in similar directions, to monitor for obstructions in the path of the door. The receiver of each pair is shielded from the transmitter of said pair to ensure that no transmitted radiation is received thereby. The receiver receives reflected radiation when an obstacle enters the path of the door.

In most elevator (also known as a lift) installations, a door control situation can arise when using currently available proximity sensors, as sensitivity of the system fails for some reason to respond to the existence of an adverse condition. Proximity detector systems for automatic doors must be sensitive to respond to moving objects whilst ignoring static objects such as walls and other fixed objects. This is often achieved by reducing sensitivity which can result in erroneous responses, in particular under changeable site conditions. Neither the door opening for no reason nor closing on an obstacle is a desirable outcome.

Therefore, the systems described in the prior art are only able to respond to items which are already within the path of the door gap (i.e. between the doors). Hence, these systems cannot detect and respond to objects entering a detection zone beyond the door gap. This results in a late response to an obstacle and a greater delay to the closing of the door. If fitted to an elevator, thus a delay in movement of the elevator.

An object of the present invention, therefore, is to provide a method and apparatus of a sensing system with a detection zone beyond the gap G between the boundary members or the doors to which they are fitted, which aims to address the problems with the known prior art systems, improving safety by anticipating a possible incoming obstruction in the path of a closing door or a pair of closing doors. For example, the doors remain open or start to re-open when an item is detected a certain distance in front of and around the doors before entering the gap G. Whilst this introduction has focused on elevator doors the invention is applicable to any powered automated closing door.

SUMMARY OF INVENTION

Aspects and/or embodiments seek to provide a method and apparatus concerned with providing a sensing system for a detection volume V having a variable location relative to either the first or second boundary member or both. One or both of the boundary members can move relative to each other. In the event an object or target enters a detection volume V of a boundary member there can arise a need to modify the relative movement of the boundary members.

According to a first aspect, there is provided a proximity detection system for detecting an object X in a detection volume V comprising:

a first boundary member and a second boundary member, defining therebetween a plane P and a gap G;

The first boundary member facing and movable relative to the second boundary member and;

the first boundary member comprising a detector mounted thereto;

the detector comprising one or more directional emitters for emitting electromagnetic radiation and one or more directional receivers for detecting the presence of said emitted electromagnetic radiation; wherein the one or more emitters are positioned facing an acute angle α to the plane P, measured in the horizontal plane, to direct electromagnetic radiation at an angle α to the plane P and the one or more receivers are positioned facing at an acute angle θ relative to the plane P when measured in the horizontal plane. Preferably, such that they do not directly receive electromagnetic radiation from the one or more directional emitters and for receiving the radiation of the emitters reflected from the object in the detection volume V.

Advantageously, the detection volume V is not bound to just one boundary member. Both boundary members will have their own defined detection volume zone. The invention does not provide a boundary-to-boundary member detection volume zone, though can work with such a system. It is the intention that a boundary to boundary system is not required with such a system. Thus the system is able to anticipate an object X as it approaches the gap G and allows earlier intervention allowing the doors to close more swiftly.

Optionally, the one or more emitters comprise down emitters and/or up emitters; wherein the up emitters are positioned to face upwards an acute angle βup relative to plane P when measured in the vertical plane and down emitters are positioned to face downwards at an acute angle βdown relative to plane P when measured in the vertical plane; and wherein the detector includes at least one down emitter and preferably at least one down emitter and one up emitter.

The present invention provides an economical, viable installation of a proximity detector system for, but not limited to, moving door systems such as those provided on elevators, to provide for safe operation even with a user who is inexperienced or inattentive when approaching the moving door. For example during boarding or leaving the elevator.

Advantageously, the compound angle provided by angle σ and angle β provides an improved detection and improved excess gain. The first angle α provides the correct direction of the emitted radiation and thus provides received energy into the correct location for optimum reflection of the emitted energy for the detection of object (X) when in the detection volume V. The second angle β provides better distinction or independence of object colour, where either transmitter or receiver being on an angle will affect the reflectance from the object X.

Optionally, the one or more receivers are positioned facing horizontally. For optimum receipt of reflected radiation from the emitters, in particular the up and down emitters of a lower detector.

Optionally, the second boundary member is movable and includes a detector mounted thereto. Providing a greater G and thus easier access and/or faster closing of the gap as there are two movable boundary members.

Optionally, the one or more emitters for each region emit electromagnetic signals of polar and/or infrared radiation. Thus improving reflectivity of the radiation and improved receipt of reflected radiation by the receivers.

Optionally, the emitted electromagnetic radiation from each emitter forms a conical shape having an angle σ.

Optionally, 0.50σ is less than α or βup or βdown, such that the emitted polar radiation does not directly meet one of the one or more receivers. Thus, receivers only receive reflected radiation creating improved sensitivity and increasing excess gain.

Optionally, the angle α is such that the emitted radiation from a detector of the first or second boundary member does not directly reach the other of the first or second boundary member. Thus, receivers only receive reflected radiation creating improved sensitivity and increasing excess gain.

Optionally, α is close to or equal to θ.

Optionally, the first boundary member and or second boundary member includes a plurality of detectors; each facing a region of the detection volume V of the respective boundary member. Optionally, including an upper detector located on the boundary member, above one or more lower detectors; wherein the lower detector includes at least one up emitter, one down emitter and a plurality of receivers.

The plurality of detectors able to work together to provide a compound sensor and improved response, having a more robust baseline signal and more reliable output and intervention.

Optionally, the upper detector includes only a down emitter and the receiver wherein the receiver is also orientated facing downwards. Advantageously, improving part count as objects are more likely to enter below the upper detector and working with the lower detectors to improve response accuracy.

Optionally, there are three detectors including one upper detector and two lower detectors wherein the two lower detectors are the same. Advantageously, providing predictability and comparability of output signal and economies of scale in manufacture.

Optionally, the lower detector includes in the following sequence vertically spaced from the top, the down emitter, a first receiver of the one or more receivers, a second receiver of the one or more receivers and the up emitter.

Optionally, the system includes a controller connected to the one or more receivers; wherein the controller includes a processor for receiving an output from each of the one or more receivers and producing a reference signal; and a comparison means for comparing the output of each receiver to said reference signal and generating a control signal when the difference between any of the output signals from the receivers and the reference signal exceeds a predetermined threshold.

Optionally, the processor includes an averaging means for producing the reference signal and the reference signal is equal to an instantaneous average or moving average of the output of the receivers.

Advantageously, providing a stable reference that compensates for static objects in the detection volume.

Optionally, the first boundary member is the leading edge of a first door movable in the plane P. Optionally, the second boundary member is the leading edge of a second door movable in the plane P.

Optionally, the first door and optionally the second door are moved by one or more actuators, the actuators are operably connected to the controller for receiving control signals therefrom; and wherein the one or more actuators are configured to modify the relative movement of the first door and optionally the second door in response to the control signal.

Optionally, the detection volume V extends vertically in the direction of plane P and extends horizontally perpendicular to plane P offset at a distance D from plane P. Advantageously, allowing the proximity detector system to act in advance of the object X arriving in the gap G improving response and efficiency of users of the system.

Optionally, angle $\alpha$ and/or angle $\theta$ is between 10 and 70 degrees and is preferably between 30 and 50 degrees and most preferably 40 to 45 degrees. Optionally, $\beta$up and/or $\beta$down is between 10 and 70 degrees, is preferably between 30 and 60 degrees and most preferably 45 to 55 degrees. Placing the emitter's and receivers in the optimum position for best reflections and improving excess gain.

Optionally, the emitters and receivers are orientated and located such that the emitted radiation of each emitter is not directly received by any receiver.

Optionally, the receiver of the detector of the second boundary member is configured to detect the emitted radiation of the detector of the first boundary member.

According to a second aspect, movable door including the proximity detection system as described herein. Optionally the movable door is an automated sliding door.

According to a third aspect, there is provided an elevator system comprising the proximity detector and/or movable door as described herein.

This invention relates to a method and apparatus for sensing. It is concerned with providing a sensing system for a detection zone having a variable location relative to either the first or second boundary member which can both move relative to each other. In the event a target enters either of these boundary member zones there can arise a need to modify such relative movement. For example, in an elevator (also known as a lift) installation a door control situation can arise, when using currently available proximity sensors, sensitivity of the system fails for some reason to respond to the existence of an adverse condition. Photoelectric devices are extensively used in connection with elevator safety systems. How effectively a photoelectric device can be expected to perform in each working environment is measured in terms of excess-gain. Excess gain is conveniently defined as the ratio of the light signal available in each device location to the minimum light signal necessary to cause the device to function. The term 'photoelectric device' should be taken to include any device operable in response to electromagnetic radiation including, but is not limited to, infra-red radiation.

BRIEF DESCRIPTION OF DRAWINGS

Embodiments will now be described, by way of example only and with reference to the accompanying drawings having like-reference numerals, in which.

The components shown in the drawing differ only in their relative position and the same reference numerals are used for the components across all figures.

DETAILED DESCRIPTION

Referring to the figures, a preferred embodiment including the proximity detection system according to the current invention installed in an elevator car 1 will now be described.

Figure 1:
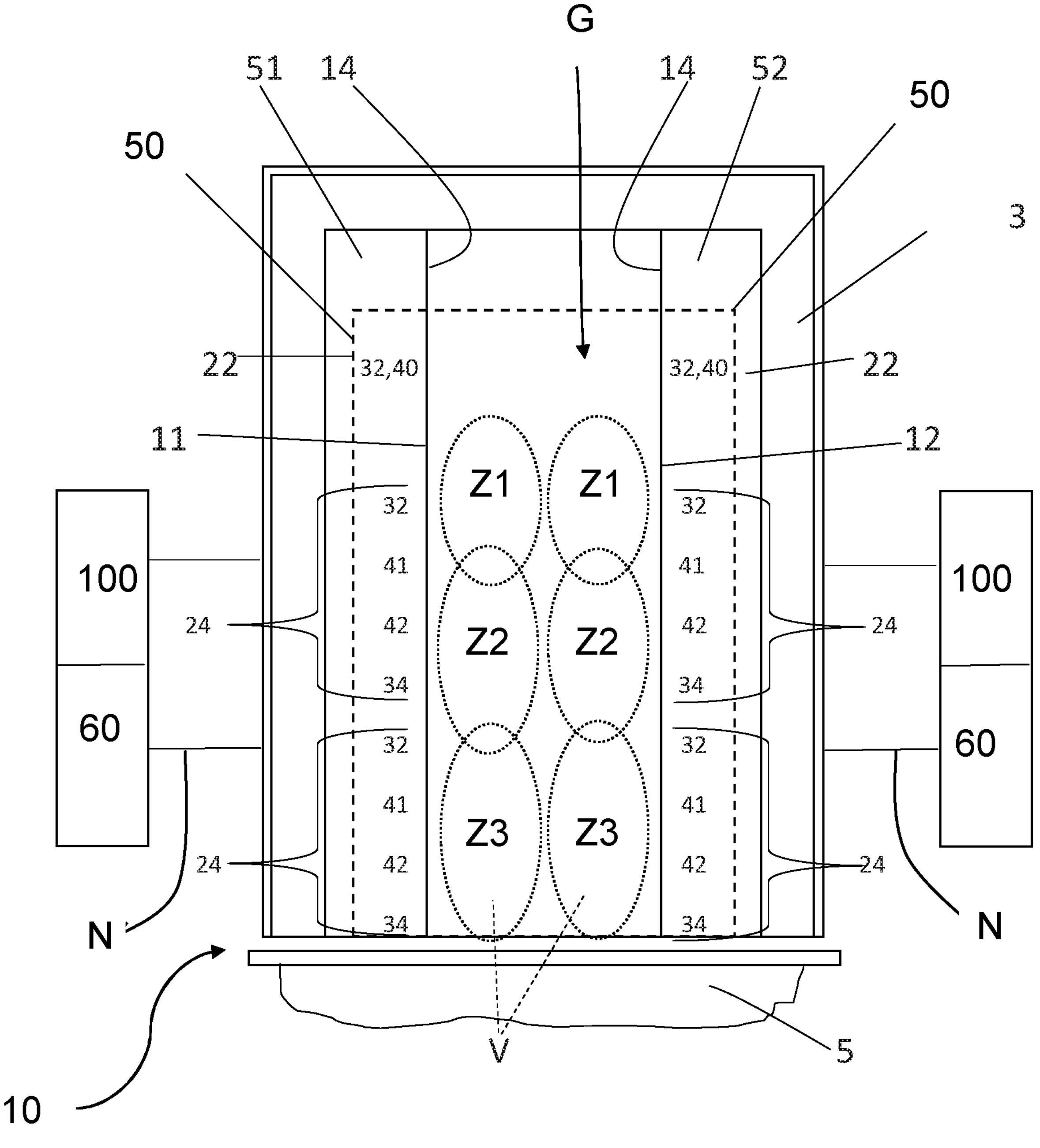
FIG. 1 shows the front view of a pair of doors including a proximity detection system according to the current invention, in a half open position, showing both boundary members.

FIG. 1 shows an elevator car 1 located in frame 3 of a door opening such as might be seen by a user approaching the elevator 1. The elevator 1 is approached from surface 5 and has a floor 6 therein on which a user may stand and car doors 50. In this example the doors 50 are movable relative to the frame 3 by one or more actuators 60. The one or more actuators 60 can comprise any conventional driving means. In this case a first door 51 and a second door 52 are used, both are movable. In an alternative installation only one door 50 is fitted or is movable.

The elevator 1 and indeed each of the doors 50 of the elevator 1 of FIG. 1 are fitted with a proximity detection system 10 according to the current invention. The proximity detector system 10 comprises a first boundary member 11 and a second boundary member 12 each extending vertically and defining therebetween a gap G and a plane P. In FIG. 1 the first boundary member 11 is the leading edge of the first door 51 and the second boundary member 12 is the leading edge of the second door 52. Each door is movable in plane P to allow access to the elevator 1 and each boundary member 11,12 is therefore movable relative to the other.

In the aforementioned alternative installation with only a single movable door 50 only the first boundary member 11 may be movable. The second boundary member 12 may be fixed in place on a second non-movable door 52 or on a static surface such as part of the frame 3.

The proximity detector system 10 is for detecting an object X on entering the detection volume V. The detection volume V extends vertically from the ground in front of the plane P and extends horizontally offset a distance D from the plane P. The distance D is greater than zero and the detection zone may extend away from P any distance greater than D depending on the application of the proximity detection system 10.

At least the first boundary member 11 is fitted with a detector 20. The detector 20 includes one or more directional emitters 30 and one or more receivers 40. The emitters 30 emit electromagnetic radiation. Preferably, said electromagnetic radiation is infrared radiation and/or is polarised, note other electromagnetic radiation can be used but infrared is preferable as it is not visible to the naked eye and has good reflective properties. The one or more receivers 40 are configured to receive the emitted radiation from the emitters 30 after reflecting of an object X. The one or more emitters 30 and the one or more receivers 40 are photo electric devices. The emitters 30 are configured to emit radiation across an arc having an angle $\sigma$. Preferably the emitters 30 emit a cone of radiation widening with distance from the emitter 30.

Figure 2:
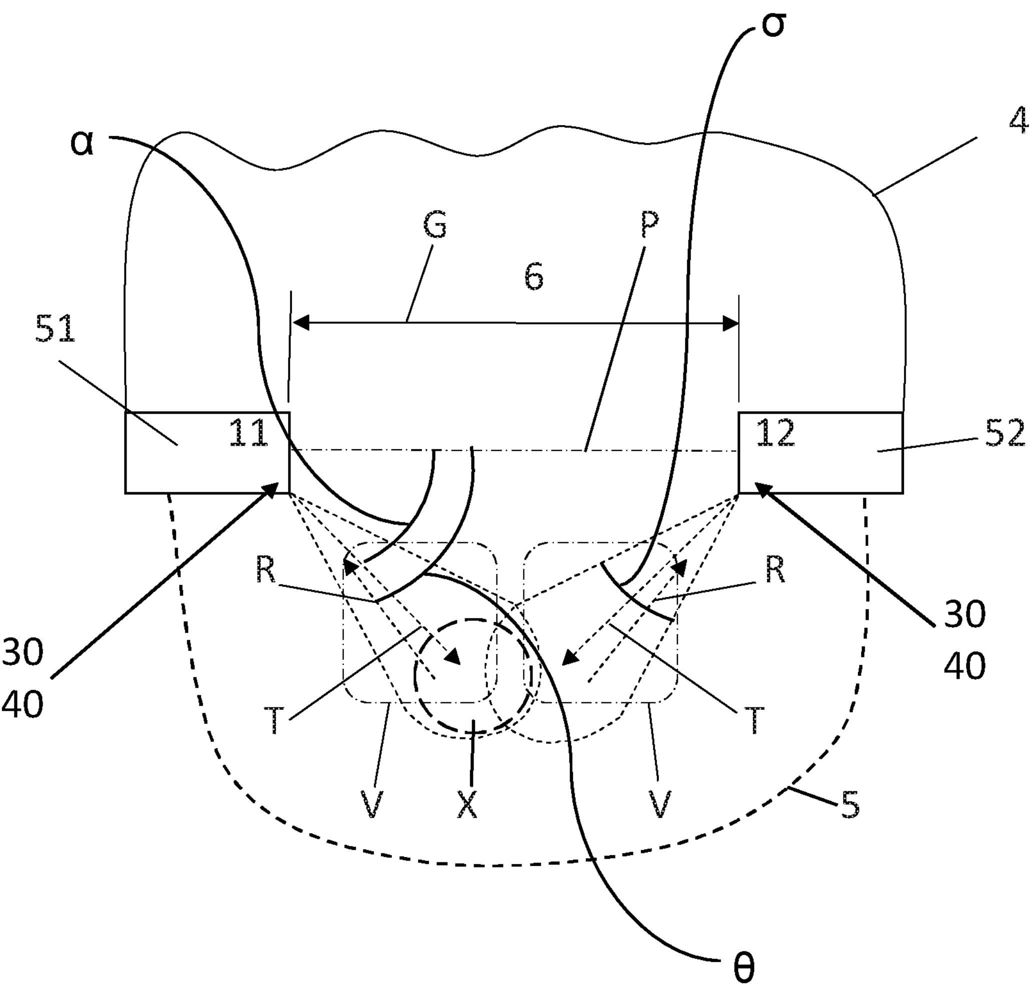
FIG. 2 shows a horizontal plane view or plan view of a horizontal section of FIG. 1.

FIG. 2 shows the proximity detector system 10 in the horizontal plane as viewed from above in plan-view. The emitters 30 are turned away from the plane P for emitting radiation into the detection volume V. When measured in the horizontal plane the one or more emitters 30 are positioned to face an acute angle $\alpha$ away from P. The one or more receivers 40 are positioned to face an acute angle $\theta$ from P. FIG. 2 also shows the arc $\sigma$ through which the one or more emitters 30 are emitting electromagnetic radiation. Angle $\alpha$ may be the same as angle $\theta$ or it may be different or greater than $\alpha$ as seen in FIG. 2. Preferably $\theta$ is close to a and further preferably within ±20 degrees. In any case angle $\alpha$ and/or angle $\theta$ is between 10 and 70 degrees and is preferably between 30 and 50 degrees and most preferably 40 to 45 degrees. Note no emitter 30 is located co-axially with a receiver 40.

Note that in FIG. 2 object X is shown having entered the detection zone V and radiation emitted by the one or more emitters 30 is being reflected by object X back toward the one or more receivers 40.

Figure 3:
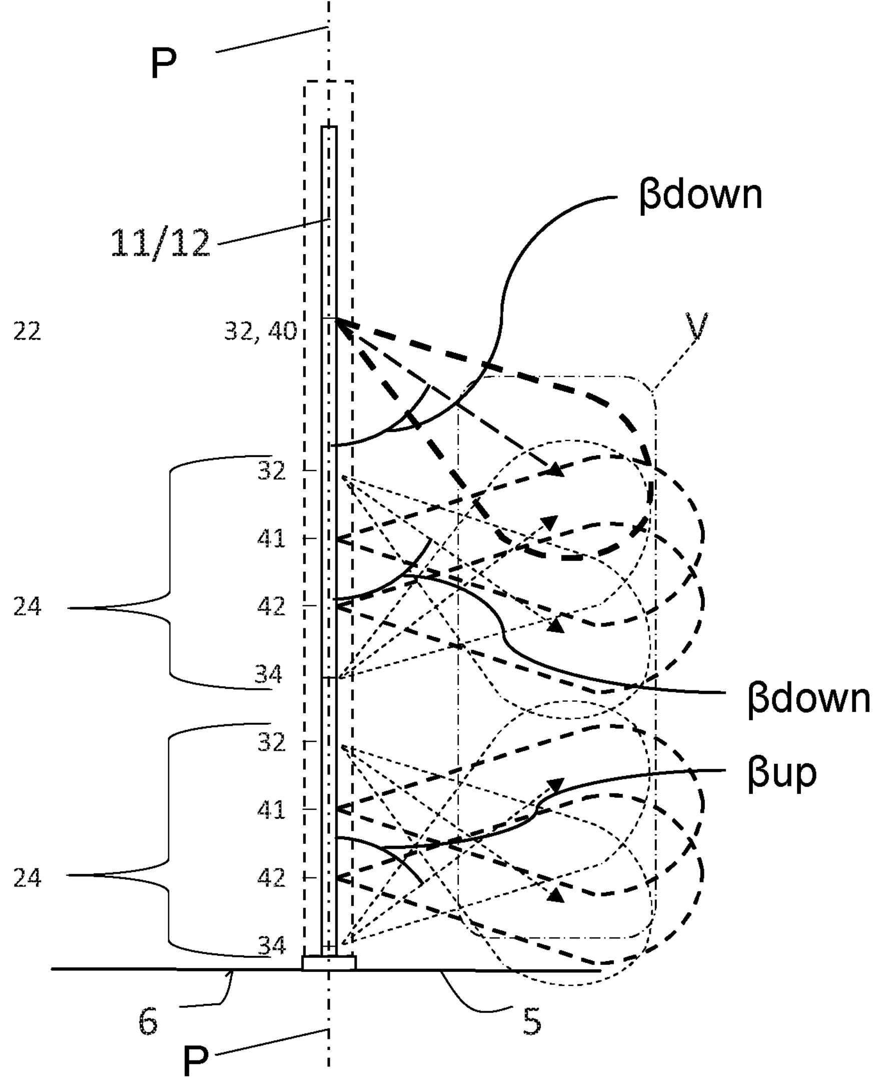
FIG. 3 shows a side view or vertical plane view of one boundary member of the arrangement of FIG. 1 showing the angles of the emitters and receivers in respect to the plane P.

FIG. 3 shows a boundary member in the vertical plane when viewed in the direction of plane P this could be the first boundary member 11 or the second boundary member 12. The boundary member 11, 12 shown includes three detectors 20, one upper detector 22 uppermost on the boundary member 11, 12 and two lower detectors 24 vertically spaced below the upper detector 22. It should be noted that two lower detectors 24 are shown but one or more lower detectors 24 can be used with or without an upper detector 22. Each of the lower detectors 24 is preferably the same as the other. The detectors 20 servicing three vertically placed regions Z1-Z3 of the detection volume V. The upper detector 22 comprises a minimum of one emitter 30 and one receiver 40 and services Z1. The lower detectors 24 service region Z2 and Z3. The lower detectors 24 each comprise a minimum of two emitters 30 and two receivers 40 spaced at set intervals along the length of the boundary member 11, 12 occupied by the detector 20. The emitters for each region emit polar radiation (in this case of infra-red radiation) into the boundary volume zone V above floor 5 and in the direction T.

The detection volume V for each boundary member includes up to three or more detectors 20 along that boundary member 11, 12. If three detectors 20 are included which is preferable, these three detectors 20 comprise of two lower detectors 24 that are identical, this having at least two emitters 30 of electromagnetic signals that are directed into a region of the detection volume V but not directly into the receivers 40 for that region and at least two receivers 40 for receiving the electromagnetic signals from emitters 30 of that detector 40. The two emitters 30 emit electromagnetic signals at the same point in time, the two receivers 40 in the detector 20 can also receive the same emitted electromagnetic signal. The emitters 30 and receivers 40 forming part of a network N including processing means 102 which form a compound sensor for use in monitoring operation of the detection volume. The regions Z1-Z3 in the detection volume V all have varying received signal levels related to the emitted electromagnetic signals that have been received from the emitters 30. When object X intrudes into the region, causing a reflection to occur, which is then direct back toward the photoelectric devices or receivers 40 within the same region. The radiation received by the receivers 40 of each of the detectors 30 for the three regions Z1-Z3 are processed to provide levels that are used to define if the differential detection threshold has been exceeded at any of the detectors 20 when compared to the detectors 20 for other regions on the boundary member.

The one or more emitters 30 comprise down emitters 32 and/or up emitters 34. The down emitters 32 are positioned to face downwards towards the floor 5 at an angle βdown relative to plane P when viewed in the vertical plane as shown in FIG. 3. The up emitters 34 are positioned to face upwards away from the floor 5 at an angle βup relative to plane P when viewed in the vertical plane as shown in FIG. 3. βup and/or βdown are between 10 and 70 degrees, is preferably between 30 and 60 degrees and most preferably 45 to 55 degrees.

Thus the direction of the radiation emitted by the emitters 30 and optionally the receiving element uses a compound angle comprising σ and β. The emitted and received energy is on two angles from the boundary member α and β relative to P. This is to perform two functions the first angle α measured in the horizontal plane and shown in FIG. 2 is to allow the correct direction of the emitted radiation labelled (T) and received energy labelled R into the correct location for optimum reflection of the emitted energy for the detection of object (X) when in the detection volume. The second angle β measured in the vertical plane and shown in FIG. 3 is where the emitter 30 or receiver 40 is at an angle from boundary member. This allows for better distinction of object color, where either transmitter or receiver being on an angle will reduce the reflectance from the object X.

Receivers 40 for each region are adapted to receive beams reflected from an object X out of volume V. When in operation the receivers 40 do not receive beams or radiation directly from any of emitters 30, from the same detector 20, or other detectors 20, on the same boundary member 11, 12; or emitters 30 of any detector 20, on the opposite boundary member 11, 12. The upper detector 22, preferably comprises a minimum of one receiver 40 also angled down when viewed in the vertical plane as shown in FIG. 3. The lower detectors 24 each comprise at least one up emitter 34 and one down emitter 32 and two receivers 40. Preferably, the lower detectors 24 include, vertically spaced, in the following sequence from the top: at least one down emitter 32, a first receiver 41 and a second receiver 42 and one up emitter 34. The first receiver 41 and the second receiver 42 may be perpendicular to the plane P when viewed in the vertical plane.

The emitters 30 are arranged such that emitted radiation from the one or more emitters 30 does not directly reach any receiver 40. The one or more emitters 30 of a first boundary member 11 are arranged such that emitted radiation of one or more emitters 30 of the detector of the first boundary member 11 does not directly reach the second boundary member 12 or any of the one or more receivers 40 that may be thereon. Specifically half the cone angle of each emitter 30, 0.5σ is less than angle α or angles βup or βdown.

Each boundary member 11, 12 functions the same with respect to the proximity detector system 10. With a target X shown in FIG. 2 entering the volume V on either boundary, at least one of emitted beams from the one or more emitters 30 will be reflected from the target X generating a secondary beam falling on one of the one or more of the receivers within the same detector 20. As result there will be change in the radiation received by one or more of the receivers and so in the output signal from each of the receivers. The signal from each of the plurality of detectors is fed into the network N. This enables the position occupied by the target X to be defined by radiation received.

Figure 4:
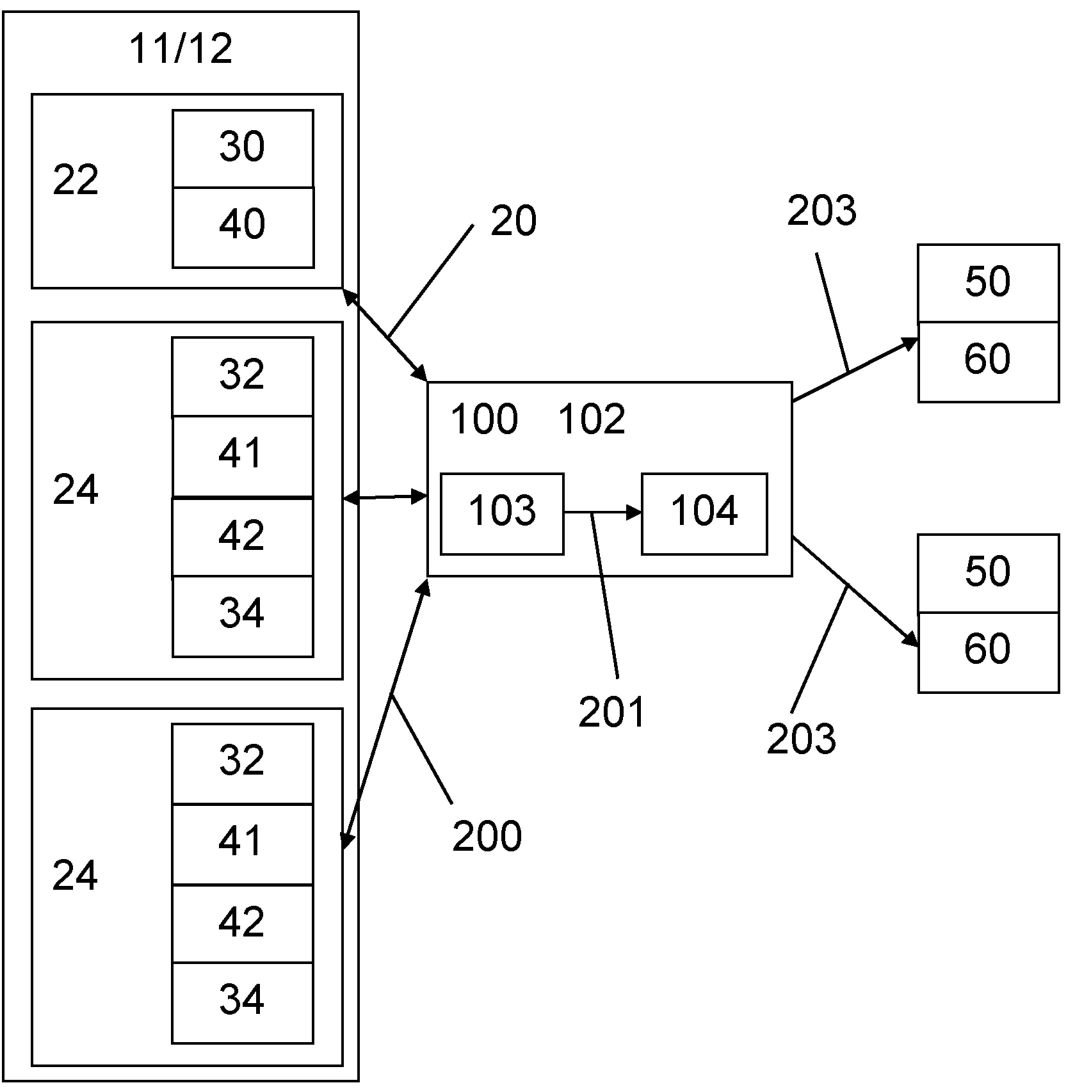
FIG. 4 shows a schematic of the control system for the proximity detection system of the current invention.

Referring to FIG. 4 a schematic view of the controller 100 and it's connections in the proximity detection system 10 will be described. The detectors 20 are operably connected to a controller 100. If a plurality of detectors 20 are included the plurality of detectors 20 form with the controller 100 a network N. Each receiver 40 is operably connected to the controller to send any output 200 from the receiver to the controller 100. The controller 100 includes a processor 102 for processing the output signals 200 received from the one or more receivers 40. Controller 100 may also be connected to each of the one or more emitters 30 for causing the emitters 30, 32, 24 to emit a signal beam of polar infra-red radiation in the direction of axis T. The one or more actuators 60 are operably connected to the controller 100 and responsive to control signals 203 therefrom. The first receiver 41 and second receiver 42 array of each lower detector 24 and the processor 102 functions to also define sensing regions Z1-Z3 with optimized, high, signal to noise ratio. Each detection zone V is constant in its volume and will not change with the gap G between boundary members 11, 12 or doors 51, 52. On target X entry into the volume zone V, reflection of radiation emitted by the down emitter 32 and the up emitter 34 is seen and processed by the first and second receivers 41, 42 and received by processor P. Processor 102 compares at a comparator 104, the output signal 200 from the receivers 40 to a reference or baseline signal 201. The processor 102 may include an averaging means 103 for producing the reference signal 201; and the reference signal 201 may be an instantaneous or moving average of the signals of the output signals 200 from the receivers 40. The reference signal 201 may be created from all receivers 40 connected to the network or a reference signal 201 may be created for each detector 20. If the difference exceeds a predetermined threshold 204, i.e. a target X is present in the detection volume V, the processor 102 will cause the controller 100 to issue a control signal 203. The actuators 60 are configured to modify the relative movement of the first door 51 and optionally the second door 52 if included in response to said control signal 203. If the outcome is for a valid target X seen, then control of the closing of the car doors 50 could be slowed, paused or re-opened to prevent the trapping a target X in the doors.

In a lower detector 24 the two emitters 30 emit electromagnetic signals at the same point in time, the two receivers 40 in the detector 20 can also receive the same emitted electromagnetic signal. The upper detector 22 has one or more emitters 30 of electromagnetic signals directed into the detection volume V and one or more receivers 40 for receiving the electromagnetic signals for that top region. The emitters 30 and receivers 40 forming part of a network N including processing means which form a compound sensor for use in monitoring operation of the sensing volume V. The sensors 20 each have varying received signal levels related to the emitted electromagnetic signals from the emitters 30 that have been received when an object X intrudes into the region causing a reflection to occur which is direct back toward the receivers 40 in the same detector 20, the output signals from the receivers 40 in each of the three detectors 20 in each boundary member 11, 12 are processed to provide levels that are used to define if a pre-set differential detection threshold has been exceeded at any of the detectors 20 when compared to the other detectors 20 on the boundary member.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A proximity detection system for detecting an object in a detection volume V comprising:
- a first boundary member and a second boundary member, defining therebetween a plane P and a gap G;
- the first boundary member facing and movable relative to the second boundary member and;
- the first boundary member comprising a detector mounted thereto;
- the detector comprising one or more directional emitters for emitting electromagnetic radiation, and one or more directional receivers for detecting the presence of said emitted electromagnetic radiation;
- wherein the one or more directional emitters are positioned facing an acute angle $\alpha$ to the plane P measured in the horizontal plane, to direct electromagnetic radiation at an angle $\alpha$ to the plane P; and
- wherein the one or more directional emitters comprise one or more up emitters and one or more down emitters,
- the one or more up emitters further positioned to face upwards at an acute angle $\beta$up relative to plane P when measured in the vertical plane, to direct electromagnetic radiation at an angle $\beta$up to the plane P, and
- the one or more down emitters further positioned to face downwards at an acute angle $\beta$down relative to plane P when measured in the vertical plane, to direct electromagnetic radiation at an angle $\beta$down to the plane P; and
- wherein the one or more directional receivers are positioned facing at an acute angle $\theta$ relative to the plane P when measured in the horizontal plane such that they do not directly receive electromagnetic radiation from the one or more directional emitters, and wherein the one or more directional receivers are for receiving the radiation of the one or more directional emitters reflected from the object O in the detection volume V.

2. The proximity detection system of claim 1, wherein the one or more directional receivers are positioned facing horizontally.

3. The proximity detection system according to claim 1, wherein the second boundary member is movable and includes a detector mounted thereto.

4. The proximity detection system of claim 3, wherein the directional receiver of the detector of the second boundary member is configured to detect the emitted radiation of the detector of the first boundary member.

5. The proximity detector system according to claim 1, wherein the one or more directional emitters emit electromagnetic signals of polar and/or infrared radiation.

6. The proximity detection system according to claim 1, wherein the emitted electromagnetic radiation from each directional emitter forms a conical shape having an angle $\sigma$.

7. The proximity detection system of claim 6, wherein $0.5\sigma$ is less than $\alpha$ or $\beta$up or $\beta$down, such that the emitted polar radiation does not directly meet one of the one or more directional receivers.

8. The proximity detection system of claim 1, wherein the angle $\alpha$ is such that the emitted radiation from a detector of the first or second boundary member does not directly reach the other of the first or second boundary member.

9. The proximity detection system of claim 1, wherein $\alpha$ is approximately $\theta$.

10. The proximity detection system of claim 1, wherein the first boundary member and/or second boundary member includes a plurality of detectors; each facing a region of the detection volume V of the respective boundary member.

11. The proximity detection system of claim 1, wherein the first boundary member or second boundary member includes a plurality of detectors; each facing a region of the detection volume V of the respective first or second boundary member, and including an upper detector located on the respective first or second boundary member, above one or more lower detectors; wherein the lower detectors include an up emitter, a down emitter and a plurality of directional receivers.

12. The proximity detection system of claim 11, wherein each lower detector includes in the following sequence vertically spaced from the top, the down emitter, a first directional receiver, a second directional receiver and the up emitter.

13. The proximity detection system of claim 12, wherein the first boundary member is the leading edge of a first door movable in the plane P and optionally the second boundary member is the leading edge of a second door movable in the plane P; and wherein the first door and optionally the second door are moved by one or more actuators, the actuators are operably connected to the controller for receiving control signals therefrom; and wherein the one or more actuators are configured to modify the relative movement of the first door and optionally the second door in response to the control signal.

14. The proximity detection system of claim 1, including a controller connected to the one or more directional receivers;

wherein the controller includes a processor for receiving an output from each of the one or more directional receivers and producing a reference signal; and a comparison means for comparing the output of each directional receiver to said reference signal and generating a control signal when the difference between any of the output signals from the directional receivers and the reference signal exceeds a predetermined threshold.

15. The proximity detection system of claim 14, wherein the processor includes an averaging means for producing the reference signal and the reference signal is equal to an instantaneous average or moving average of the output of the directional receivers.

16. The proximity detection system of claim 1, wherein the first boundary member is the leading edge of a first door movable in the plane P.

17. The proximity detection system of claim 16, wherein the second boundary member is the leading edge of a second door movable in the plane P.

18. The proximity detection system of claim 1, wherein the detection volume V extends vertically in the direction of plane P and extends horizontally perpendicular to plane P offset a distance D from plane P.

19. The proximity detection system of claim 1, wherein angle $\alpha$ and/or angle $\theta$ is between 10 and 70 degrees.

20. The proximity detection system of claim 1, wherein $\beta$up and/or $\beta$down is between 10 and 70 degrees.

21. The proximity detection system of claim 20, wherein the directional emitters and directional receivers are orientated such that the emitted radiation of each directional emitter is not directly received by any directional receiver.

22. A movable door or elevator including the proximity detection system of claim 1.

* * * * *